June 9, 1964  P. H. LUIN  3,136,296
BIRD FEEDER

Filed Nov. 20, 1962  2 Sheets-Sheet 1

INVENTOR.
PRESTON H. LUIN
BY *Rudolph L. Lowell*
ATTORNEY.

June 9, 1964 P. H. LUIN 3,136,296
BIRD FEEDER
Filed Nov. 20, 1962 2 Sheets-Sheet 2
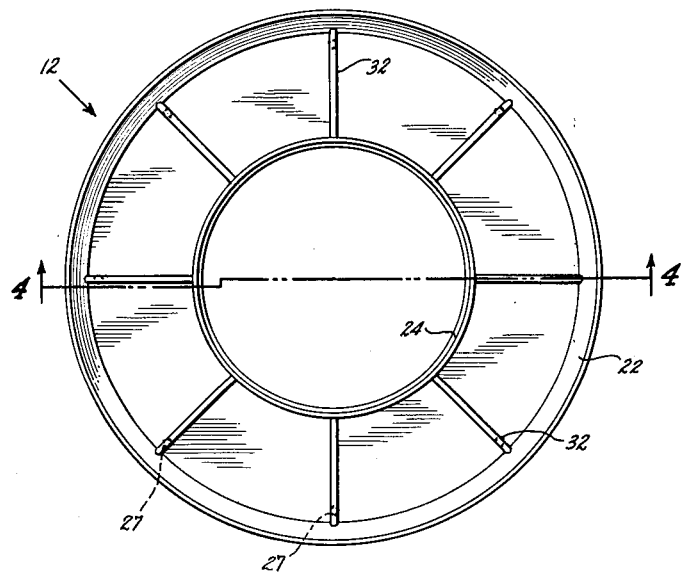
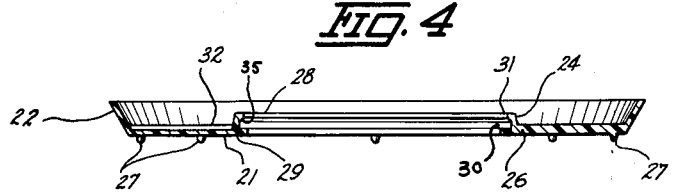
INVENTOR.
PRESTON H. LUIN
BY *Rudolph L. Lowell*
ATTORNEY.

United States Patent Office 3,136,296
Patented June 9, 1964

3,136,296
BIRD FEEDER
Preston H. Luin, 100 State St., Atlantic, Iowa
Filed Nov. 20, 1962, Ser. No. 238,856
1 Claim. (Cl. 119—52)

This invention relates to bulk material storing and dispensing apparatus and more particularly to a tray and container combination for self-feeding seeds and grain to birds.

It is the object of the invention to provide a grain dispensing apparatus which includes a container for storing the bulk material and a tray positioned on the container for receiving the material dispensed from the container.

Another object of the invention is to provide a bird feeder which utilizes a hermetically sealed seed and grain storage container and an annular tray adapted to be frictionally held on the container.

A further object of the invention is to provide a self-feeding bulk material dispensing apparatus constructed from a minimum number of parts which can be assembled with a minimum amount of time and effort.

An additional object of the invention is to provide a sealed seed and grain storage container for a bird feeder which can be conveniently shipped and displayed.

Still another object of the invention is to provide a durable and reliable bird feeder which is simple and rugged in construction, easy to assembly, and economical to manufacture.

The exact nature of the invention as well as other objects and advantages thereof will be readily apparent from a consideration of the following specification relating to the annexed drawing in which:

FIGURE 3 is a plan view of the feed holding tray of the bird feeder shown in FIGURE 1; and FIGURE 4 is a sectional view taken along the line 4—4 of FIGURE 3.

Figure 1:
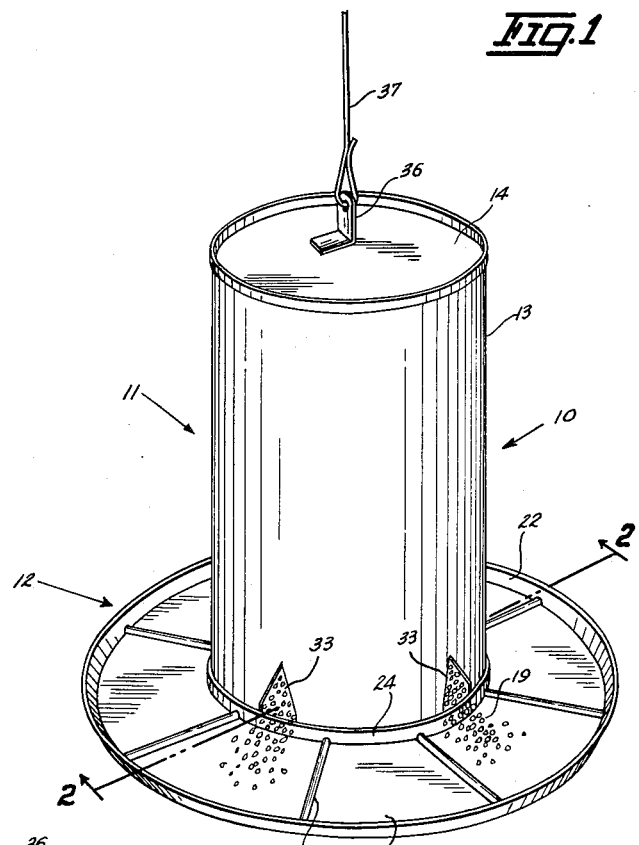
FIGURE 1 is a perspective view of the bird feeder according to the invention showing the feed container in assembled relationship with the feed retaining tray.

Referring to the drawing, there is shown in FIGURE 1 a bulk material storing and dispensing apparatus 10 comprising a cylindrical container 11 in assembled relationship with an annular tray 12. The cylindrical container 11 is preferably a No. 46 metal can of a commercially available type having an annular side wall 13 and circular top and bottom end walls 14 and 16 which are swaged or rolled over the ends of the side wall to form annular beads 17 and 18. In use, the container 11 is filled with seeds and grains known to be desirable to most birds of North America. The top and bottom end walls 14 and 16 hermetically confine the bulk material 19, such as bird seeds and grain, in the container 11.

The annular tray 12 is of dish shape and is formed of a deformable or resilient material, such as plastic or rubber. Specifically, the tray 12 has a flat bottom wall 21 with an upwardly and outwardly extending peripheral lip or rim 22 integrally formed with the outer peripheral edge 23 thereof and an annular upright lip 24 integrally formed with the inner peripheral edge 26 thereof. Integrally formed on the bottom side of the flat wall 21 adjacent the outer peripheral edge 23 thereof are a plurality of circumferentially spaced and downwardly directed projections 27 which function as supporting tabs for the tray 12. The tray 12 is reinforced by a plurality of circumferentially spaced ribs 32 which extend radially from the lip 24 to the annular rim 22.

Figure 2:
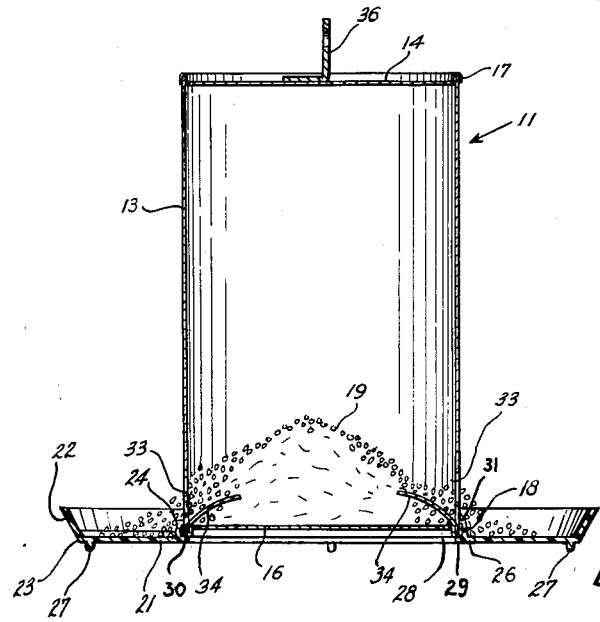
FIGURE 2 is a sectional view taken along the line 2—2 of FIGURE 1.

As shown in FIGURES 2 and 4, the inner peripheral surface 28 of the annular lip 24 contains an annular groove 30 adapted to receive the annular bead 18 of the container 11. The groove 30 is formed by a lower annular wall 29 and an upper annular wall 31 which extend toward the center of the tray and define a hole. The inside surface 35 of the upper annular wall 31 is tapered upwardly and inwardly at an angle of about fifteen degrees to facilitate the assembly of the tray 12 over the bead 18 of the container 11 and to ensure a frictional clamping or locking action between the annular lip 24 and the container bead 18. The diametrical dimension of the hole formed by the upper wall 31 of the lip 24 is slightly smaller than the outer diametrical dimension of the container 11 adjacent the bead 18. The diametrical dimension of the hole formed by the lower annular wall 29 is smaller than the outer diameter of the bead 18 and functions as a stop to prevent tilting of the tray on the container 11.

In use, the feeding apparatus is put in a dispensing condition by initially puncturing the side wall 13 of the container 11 adjacent the annular bead 18 when the container is supported in an inverted position on the end wall 14. The container side wall 13 is punctured with a hand tool having a triangular shaped point in the handle such as the common hand can opener. The punched out portion 34 of the side wall 13 are bent in an inward direction by the hand tool to form circumferentially spaced dispensing openings 33 of a triangular shape as shown in FIGURES 1 and 2. With the container 11 positioned on the end wall 14 the deformable or flexible tray is placed about or centered on the end wall 16 so that the bead 18 thereof engages the upper annular wall 31. The centered tray is pressed in a downward direction until the tray lip 24 snaps over the container bead 18. Since the diametrical dimension of the hole formed by the upper wall 31 of the lip 24 is slightly smaller than the diameter of the container 11, the wall 31 frictionally grips the side wall of the container and clamps the lip 24 over the container bead 18.

As shown in FIGURE 2 the annular lip 24 resiliently engages the portion of the circular side wall 13 adjacent the bead 18. In this position the holes 33 in the side wall 13 are adjacent the bottom wall 21 of the tray. When the container is turned right side up the seed and grain 19 therein will flow through the holes 33 onto the flat bottom wall 21. As the birds remove the seeds and grain from the tray additional seed and grain will under the action of gravity flow through the openings 33 into the tray 12.

In order to suspend the assembled bird feeder from a support the top end wall 14 of the container 11 is provided with an angular tab 36. A suitable flexible means 37, such as cord or wire, connects the tab 36 to the support member.

While there have been shown, described and pointed out the fundamental novel features of the invention as applied to the preferred embodiment, it will be understood that various omissions, substitutions, changes in form and details of the apparatus illustrated may be made by those skilled in the art, without departing from the spirit of the invention. It is intended to be limited only as indicated by the scope of the following claim.

I claim:

An apparatus for self-feeding bulk material comprising in combination, (a) container means including side walls, a top end wall, and a bottom end wall adapted to confine bulk material and having a continuous laterally projected bead at the juncture of the side walls and the bottom end wall and at least one hole in the side wall adjacent said bead, (b) tray means formed from a deformable material and having an opening therein slightly smaller than said bottom end wall adjacent said annular bead and defining an upwardly extended peripheral wall having an inner peripheral surface which includes a peripheral groove adapted to receive the bead of said container means, said tray means being positioned on said container means so that the side walls thereof adjacent the top of the bead frictionally engage the peripheral wall of the tray means forming the opening therein when the bead is positioned in said peripheral groove of the tray means, and (c) means secured to the top end wall of said wall of said container means adapted to engage means to suspend the apparatus from a support.

References Cited in the file of this patent

UNITED STATES PATENTS

| | | |
|---|---|---|
| D. 115,321 | Pueschel | June 20, 1939 |
| 2,813,509 | Bruno | Nov. 19, 1957 |
| 3,074,377 | Spencer | Jan. 22, 1963 |